Figure 6:
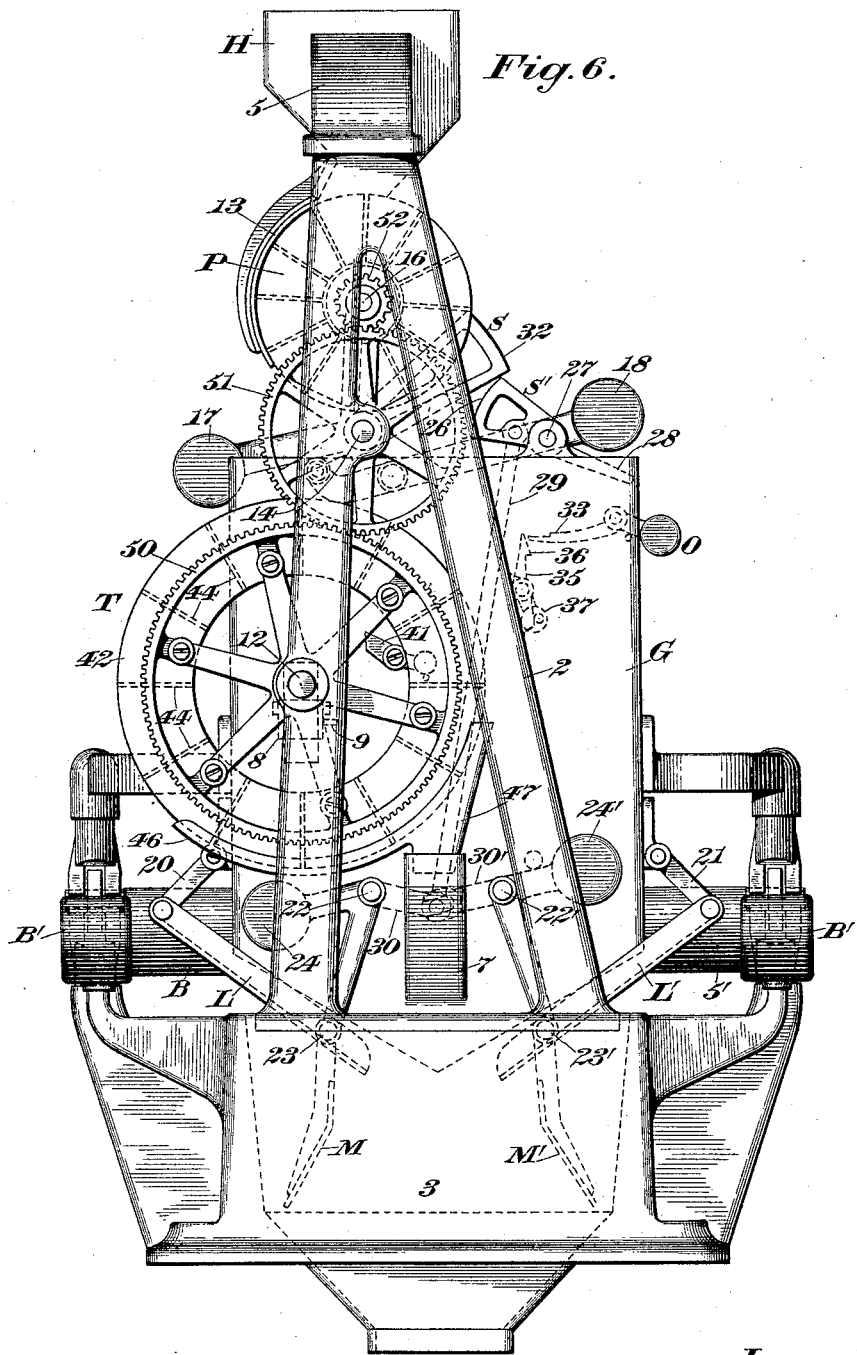

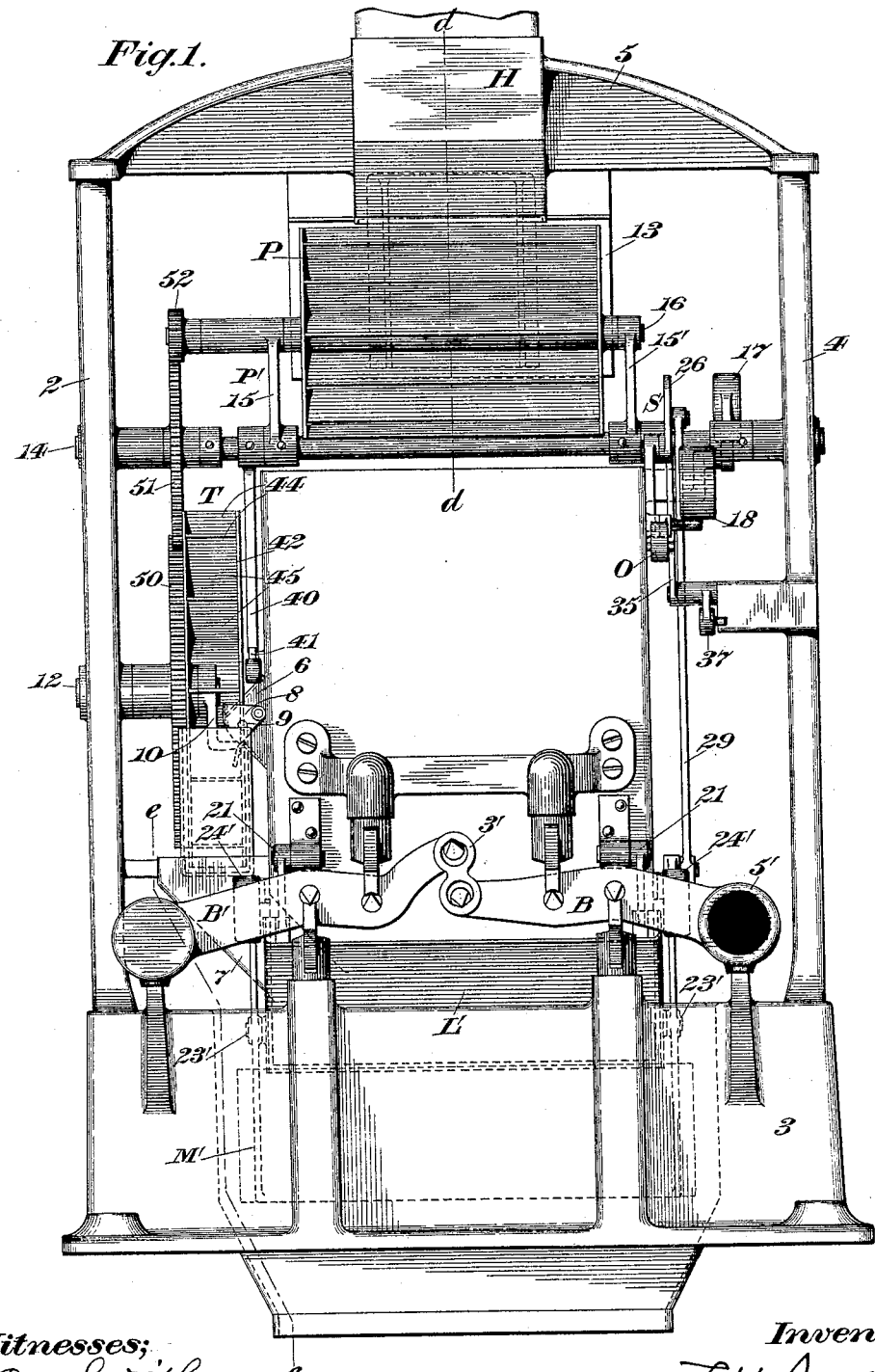

No. 607,463. Patented July 19, 1898.
F. H. RICHARDS.
AUTOMATIC WEIGHING MACHINE.
(Application filed Aug. 25, 1897.)
(No Model.) 8 Sheets—Sheet 2.
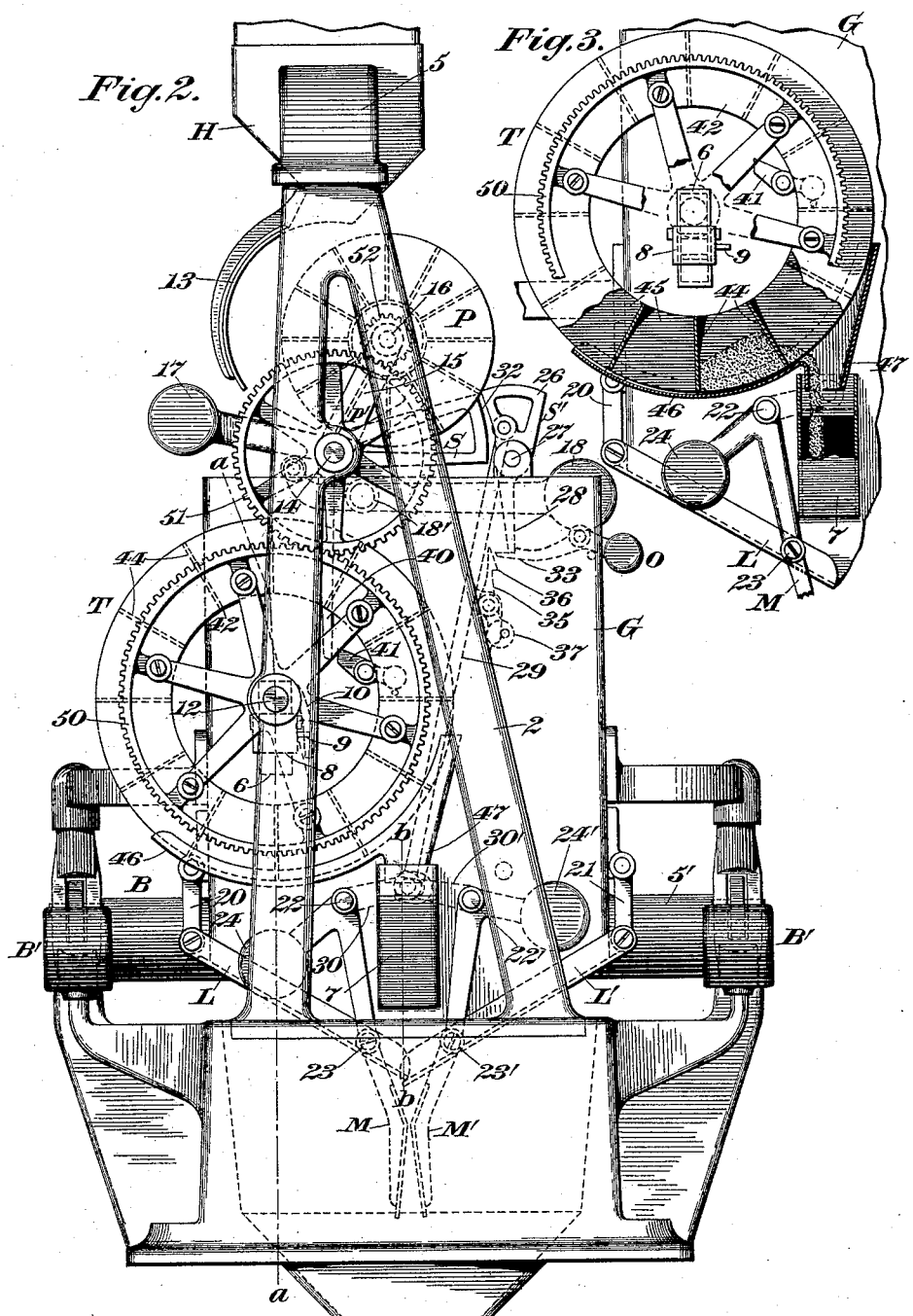
Witnesses:
O. W. Smith
Fred. J. Dole.
Inventor:
F. H. Richards No. 607,463. Patented July 19, 1898.
F. H. RICHARDS.
AUTOMATIC WEIGHING MACHINE.
(Application filed Aug. 25, 1897.)
(No Model.) 8 Sheets—Sheet 3.
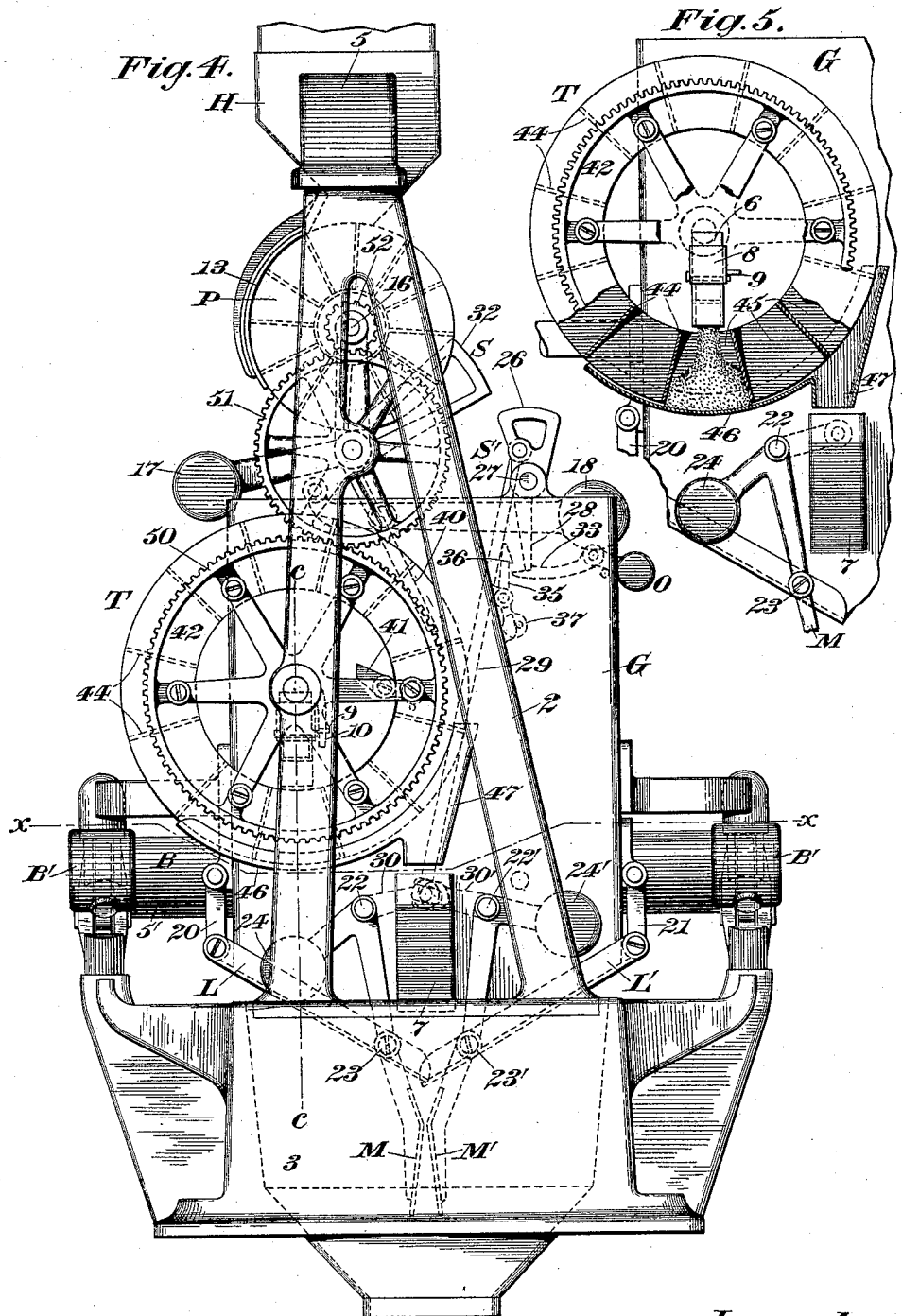
Witnesses:
Inventor:

No. 607,463. Patented July 19, 1898.
F. H. RICHARDS.
AUTOMATIC WEIGHING MACHINE.
(Application filed Aug. 25, 1897.)
(No Model.) 8 Sheets—Sheet 4.

Witnesses:
C. W. Smith
Fred. J. Dole

Inventor:
F. H. Richards

No. 607,463. Patented July 19, 1898.
F. H. RICHARDS.
AUTOMATIC WEIGHING MACHINE.
(Application filed Aug. 25, 1897.)
(No Model.) 8 Sheets—Sheet 5.

Witnesses:
W. S. Hawkins
Fred. J. Dole

Inventor:
F. H. Richards

No. 607,463. Patented July 19, 1898.
F. H. RICHARDS.
AUTOMATIC WEIGHING MACHINE.
(Application filed Aug. 25, 1897.)
(No Model.) 8 Sheets—Sheet 6.
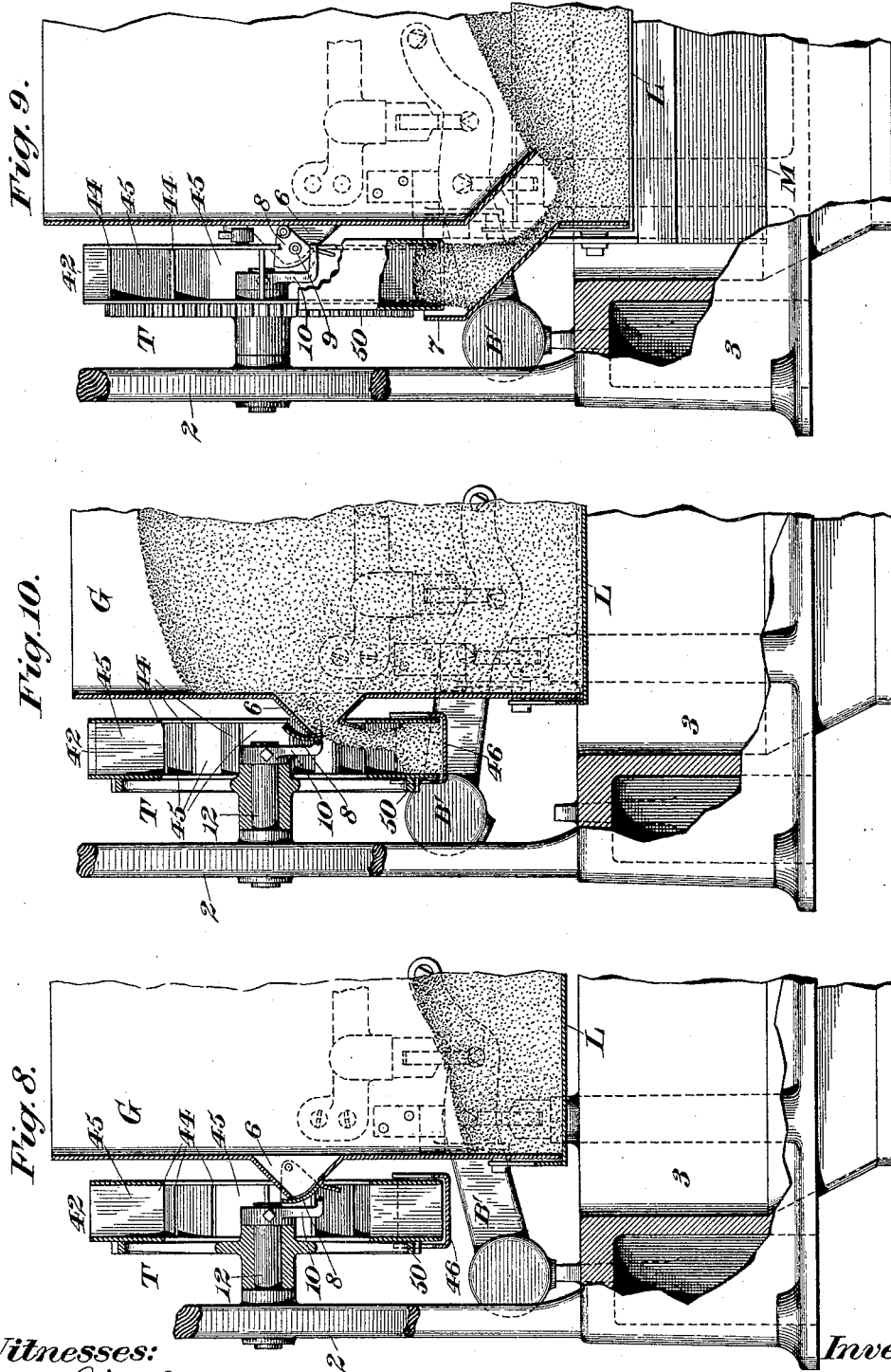
Witnesses:
C. W. Smith
Fred. J. Dole.
Inventor:
F. H. Richards.

No. 607,463.
F. H. RICHARDS.
AUTOMATIC WEIGHING MACHINE.
(Application filed Aug. 25, 1897.)
Patented July 19, 1898.
(No Model.)
8 Sheets—Sheet 7.
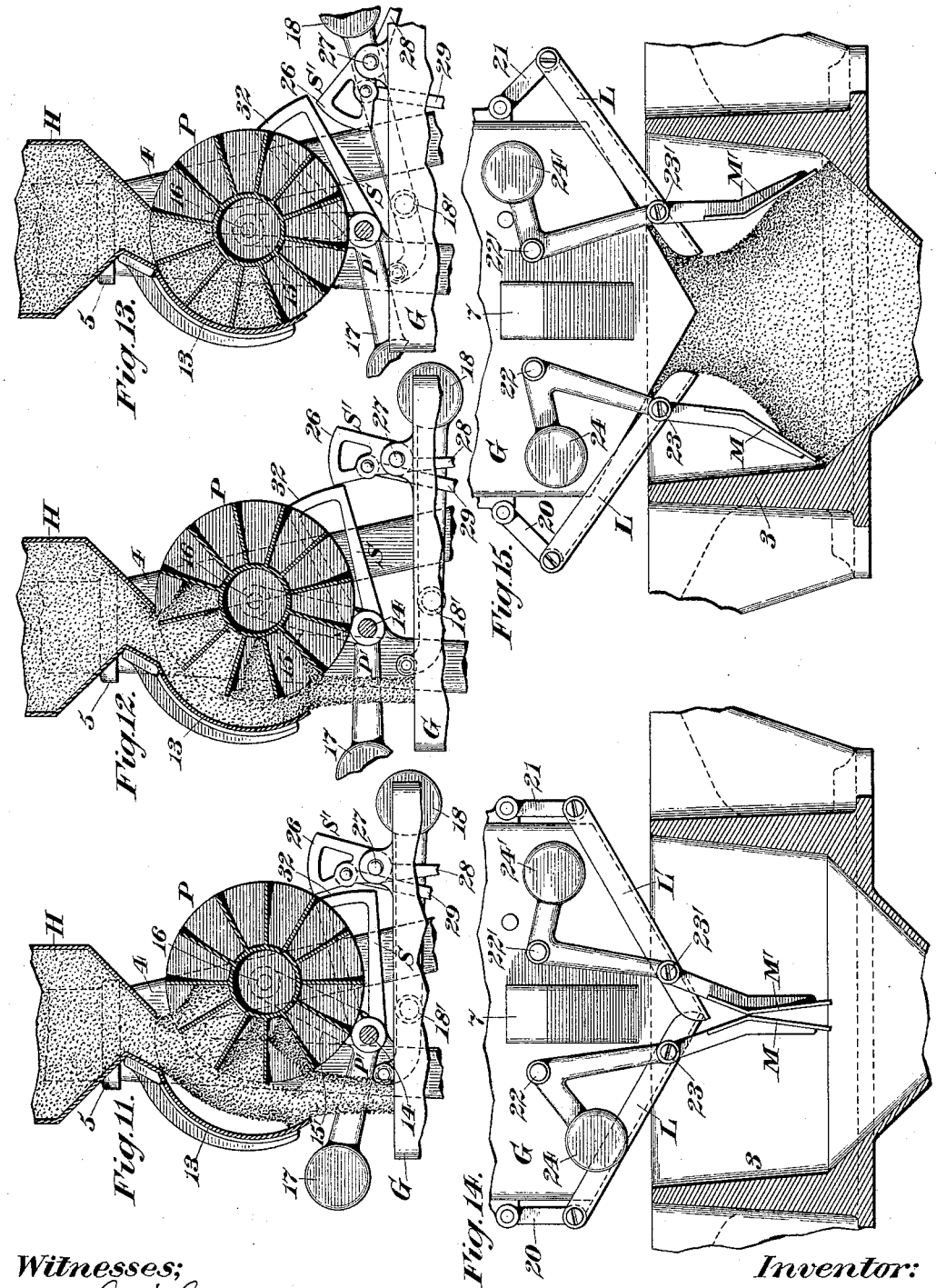
Witnesses;
O. W. Smith
Fred. J. Dole.
Inventor:
F. H. Richards No. 607,463. Patented July 19, 1898.
F. H. RICHARDS.
AUTOMATIC WEIGHING MACHINE.
(Application filed Aug. 25, 1897.)

(No Model.) 8 Sheets—Sheet 8.

Witnesses:
O.W.Smith
Fred. J. Dole.

Inventor:
F.H.Richards ns of the several elements of the overload-
UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 607,463, dated July 19, 1898.

Application filed August 25, 1897. Serial No. 649,417. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to an automatic weighing-machine of that class in which an overload is first supplied to the load-receiver or bucket and in which the surplus material is subsequently removed to bring the load-receiver or bucket to a true poise, and after which the load-discharger or closer of the load-receiver is opened and the completed load discharged, as described, for instance in Letters Patent of the United States No. 572,067, granted to me November 24, 1896, to which reference may be had.

One object of my present invention is to provide an improved automatic weighing-machine comprehending a load-receiver or bucket having a surplus-discharger and a surplus-receiver, a rotary surplus-conveyer supported in operative relation with the surplus-discharger and surplus-receiver, and an overload-supplying means including a chute and a material-driven power-transmitter supported below said chute and shiftable in a plane transverse to its path of rotation, and which power-transmitter is operatively connected with and is effective for rotating the conveyer.

A further object of my present invention is to furnish a weighing-machine comprehending a rotary conveyer and a reciprocatory load-receiver set side by side and movable in parallel planes and each of which includes means for transferring material to the other, and the construction, organization, and operation are such that the transfer of material to each other will take place alternatively.

A further object of the invention is to furnish an automatic weighing-machine embodying improved overload-supplying means including a material-rotated power-transmitting stream-controller, improved load reducing and resupplying means including a rotary conveyer in geared connection with and operated by the power-transmitter, and improved means for controlling the operations of the several elements of the overload-supplying and overload-resupplying means.

Figure 7:
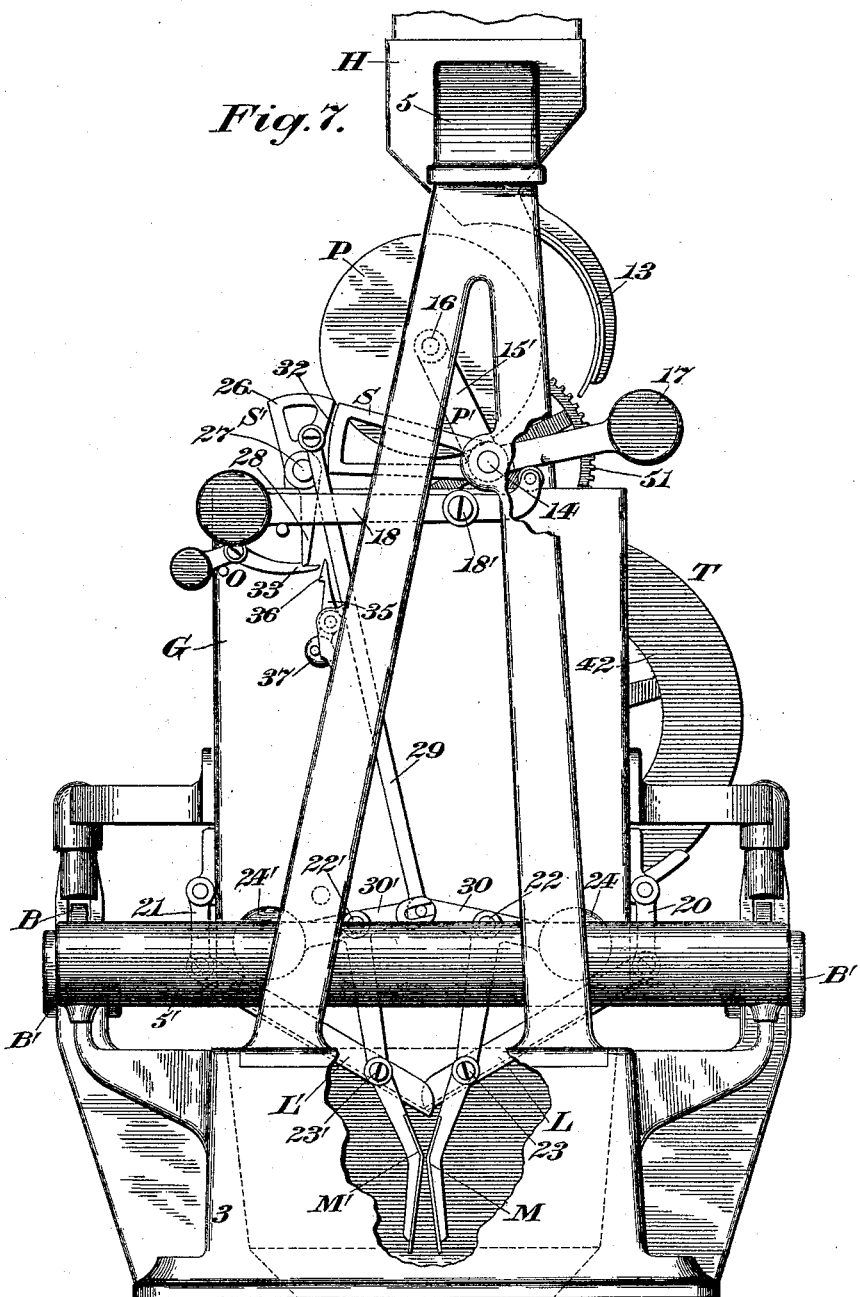
Figure 16:
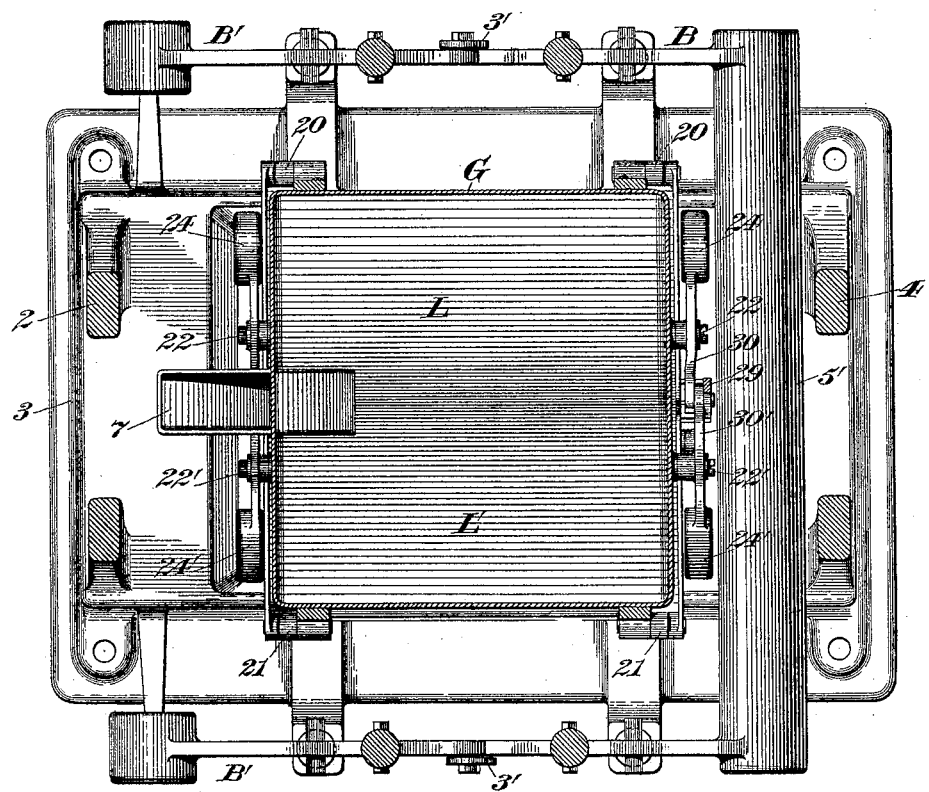

In the drawings accompanying and forming part of this specification, Figure 1 is a front elevation of a weighing-machine embodying my present improvements. Fig. 2 is a side elevation of the weighing-machine, illustrating the rotary power-transmitter in the position it occupies during the supply of material to the load-receiver and showing the load-discharger or closer members of the load-receiver in their normal closed positions, the load-receiver being in its normal load-receiving position. Fig. 3 is a similar side elevation, partially in section, of the lower portion of the load-receiver and load reducing and resupplying means, showing the transferring-receiver or conveyer operating to resupply material to the load-receiver. Fig. 4 is a side elevation similar to Fig. 2, showing the parts of the weighing-machine in the positions they occupy when the main supply to the load-receiver is cut off by the power-transmitter and when the load-receiver is in its overpoised position and is discharging the surplus or overload to the conveyer. Fig. 5 is a similar side view, partially in section, of a portion of the lower end of the load-receiver, the conveyer, and subsidiary elements and illustrates the operation of reducing the overload. Fig. 6 is a side elevation similar to Figs. 2 and 4, showing the parts of the weighing-machine in the positions they occupy during the discharge of the completed load from the load-receiver. Fig. 7 is a view similar to Fig. 2 of the opposite side of the weighing-machine, portions of the base and frame being broken away and showing the parts in positions corresponding to the positions of like parts illustrated in Fig. 2. Fig. 8 is a longitudinal section of a portion of the lower part of the weighing-machine, partially in elevation, taken in dotted line *a a*, Fig. 2, and showing the parts at the left of said line, the load-receiver and other elements illustrated in this figure being in the positions they occupy during the supply of material to said load-receiver. Fig. 9 is a longitudinal section of a portion of the lower part of the weighing-machine somewhat similar to Fig. 8, taken on dotted line *b b*, Fig. 2, and showing the parts in the positions illustrated in said Fig. 8, this figure being intended more clearly to illustrate the operation of the resupplying instrumentalities. Fig. 10 is a longitudinal section of a portion of the lower part of the weighing-machine, taken in dotted line c c, Fig. 4, this figure being intended to illustrate the operation of the load-reducing instrumentalities. Figs. 11, 12, and 13 are central longitudinal sections, taken on lines corresponding with the dotted line d d, Fig. 1, of the upper portion of the weighing-machine, illustrating the operation of the overload-supplying means and showing, respectively, three successive positions of the power-transmitter and subsidiary instrumentalities, Fig. 11 showing the power-transmitter in the position it occupies during the supply of material to the load-receiver, Fig. 12 the power-transmitter in the first stage of its chute-closing movement, and Fig. 13 said power-transmitter and the locking and shifting devices therefor in the positions they occupy when the load is completed in and is being discharged from the load-receiver. Figs. 14 and 15 are sectional views, taken in line e e, Fig. 1, of the lower portion of the weighing-machine and illustrate, respectively, two successive positions of the load-discharger or closer, Fig. 14 showing the discharger in its closed position and Fig. 15 the discharger in its open or load-discharging position. Fig. 16 is a cross-sectional view of the machine, taken on dotted line x x, Fig. 4, illustrating the beam mechanism employed.

Similar characters designate like parts in all the figures of the drawings.

The framework for supporting the operative parts of the machine may be of any suitable construction, and it is shown consisting of two end frames or columns 2 and 4, mounted upon a chambered supporting-base 3, into which the completed loads are discharged from the load-receiver or bucket, said columns 2 and 4 being surmounted by the top plate 5 in the usual manner.

For sustaining the bucket I have shown beam mechanism of the "duplicate" class similar to the weighing mechanism in the patent hereinbefore referred to, which weighing mechanism, briefly described, consists of the counterweighted scale-beams B and B', fulcrumed on the base 3 and provided with suitable knife-edges on the poising ends thereof for supporting said bucket. Each beam is shown comprising two counterweighted parallel beam-arms, and the arms of one beam are shown in the present instance connected with those of the other beam at the inner end by links 3', which engage oppositely-disposed knife-edges carried by said beam-arms. The beam-arms of one beam are shown connected together by a tubular shaft or connector 5', whereas the counterweighted beam-arms of the other beam are disconnected, so as to leave the front of the machine unobstructed for the operation of instrumentalities hereinafter described.

The bucket or load-receiver (designated by G) is of the "single-chamber" class and is of substantially the same general construction as the load-receiver described in my contemporaneously-pending application, Serial No. 648,069, filed August 12, 1897.

The term "bucket" as herein employed signifies any suitable form of load-receiver and should be so read in connection with the claims. The bucket is shown furnished intermediate its receiving and discharging ends with two conduits or spouts 6 and 7, which communicate through a side wall thereof with the interior of said bucket and are located one above and at one side of the other. These conduits, on account of their functions, are respectively termed the "surplus-discharger" and "surplus-receiver."

The lower or surplus-receiving conduit is shown somewhat in the nature of a chute open at its upper end, and the upper conduit 6 is shown furnished with a gravitative valve 8, which is pivoted thereon and is adapted for controlling the discharge of material through this conduit, said valve being normally retained in its closed position by its own weight and having a projection 9, adapted to coöperate with the valve-actuator during the descending movement of the bucket, whereby said valve may be opened.

As a means for actuating the valve 8, which for convenience will be termed the "load-reducing" valve, I have provided a valve-actuator, which, in the preferred form thereof shown most clearly in Fig. 9, is in the nature of a fixed arm 10, the outer end of which is located in the path of vertical movement of a projection 9 on the valve 8, said actuator 10 being preferably fixed to a stud 12, supported on the framework.

The overload-supplying means, in the preferred form thereof shown in the accompanying drawings, comprises a supply hopper or chute H, supported above the load-receiver and preferably forming a part of the top plate 5 of the framework, said chute having at the discharge end and at one side thereof a curved depending closer-plate 13 and a combined power-transmitter and stream-controller (designated by P and shown herein as a multi-compartment overshot power-wheel) pivotally supported for rotation below the supply-chute in such manner as to be capable of movement in opposite directions toward and away from the closer 13 and in a plane intersecting the line of flow of the material.

As a convenient means for supporting the power transmitter or wheel P for rotative and diametrical movement I have provided a power-wheel carrier P', which, in the preferred form shown in the drawings, is in the nature of a bracket preferably supported for oscillatory movement on the shaft 14, journaled in bearings on the framework, and which bracket has outwardly-extending arms 15 and 15', in the outer ends of which is journaled the shaft 16 of the power-wheel. This power-wheel carrier is also shown furnished with a counterweighted arm 17 for shifting the power-wheel into a position for closing the discharge-outlet of the supply-chute and with its periphery in engagement with the inner face of the curved closer-plate 13, said counterweighted arm constituting an actuator for shifting the power-wheel in one direction. The power-wheel is shown having a multiplicity or circuit of circumferentially-disposed compartments open at their outer ends and closed at their inner ends, and the closer-plate 13 is so disposed relatively to the power-wheel that when said wheel is in position for closing the discharge-outlet of the supply-chute it will cover the open ends of the filled compartments of said power-wheel and prevent the escape of material therefrom and thus cut off the supply to the load-receiver. (See Fig. 13.) For the purpose of shifting the power transmitter or wheel P in an opposite direction, or into the position shown in Figs. 2 and 11, whereby the same may be rotated by the impact of material discharged from the supply-chute, and at the same time facilitate the supply of material to the load-receiver or bucket, I have provided an auxiliary actuator 18, (shown in the nature of a counterweighted lever,) fulcrumed at 18' on the load-receiver near the upper end thereof and having a bearing at its non-counterweighted end against the under side of the counterweighted lever 17 and adapted, as hereinbefore described, for elevating said counterweighted arm. These two counterweighted actuators 17 and 18 are reciprocally effective in their operations for shifting the power-transmitter in opposite directions alternately. The lever or actuator 18 is constructed, disposed, and counterweighted to normally overcome the resistance of and thus tend to elevate the counterweighted actuator 17.

For convenience the opposing diametrical movements of the power-transmitter may be herein termed the "opening" and "closing" movements, respectively, thereof, the opening movement signifying a movement of the power-transmitter from the position shown in Fig. 4 toward the position thereof shown in Fig. 2 and the closing movement signifying a movement of said power-transmitter toward the chute-closing position. (Shown in Fig. 4.)

For the purpose of blocking the power transmitter or wheel against opening movement during the discharge of material from the load-receiver interlocking instrumentalities are provided in connection with the load-discharger of the load-receiver, which will be hereinafter described.

The load-receiver or bucket G is provided at the lower end thereof with a load-discharger, which, in the preferred form thereof shown in the drawings, comprises two opposite and obliquely-disposed closers or closer-plates L and L', which are shown pivotally supported at their outer ends on links 20 and 21, respectively, which in turn are pivotally supported at their upper ends on brackets secured to the opposite side walls of the load-receiver, and two opposing regulators (designated in a general way by M and M') pivotally supported at their upper ends at 22 and 22' on the load-receiver and pivotally connected at points intermediate their ends, as at 23 and 23', to the inner ends of the closers L and L', respectively, said regulators being furnished with counterweighted actuators 24 and 24', respectively, for normally imparting closing movements to the regulators M and M' and the closers L and L' simultaneously. Each regulator, in the preferred form thereof illustrated most clearly in Figs. 1, 7, and 9 of the drawings, comprises a vertically-disposed angular blade extending the entire width of and below the closer to which the regulator is pivoted and two vertically-disposed angular counterweighted arms extending upward from opposite ends of said blade and pivotally supported at their angles on studs extending from opposite sides, respectively, of the load-receiver, as shown in dotted lines in Fig. 1.

As a convenient means for preventing an opening movement of the load-discharger when the material-actuated power-wheel is in its rotating position, and also prevent an opening movement of the power-transmitter when the load-discharger is open, I have provided in connection with the counterweighted actuators 24 and 24' of the regulators M and M' and in connection with the power-transmitter carrier two reciprocally-effective stop devices S and S', the former of which is operative with the transmitter-carrier and the latter of which is connected with the regulators M and M' of the load-discharger.

The stop device S' comprises a stop member 26 (herein shown as a skeleton segment-disk pivotally supported at 27 on and at the upper end of the load-receiver and having a depending latch-engaging arm 28) and a closer-sustaining rod 29, pivotally connected at its upper end to the stop member 26 and shiftably connected at its lower end to inwardly-extending arms 30 and 30' on the regulators M and M', these arms being preferably bifurcated at their inner ends, and the lower end of the sustaining-rod having a pin seated in the bifurcated ends of said arms, this construction facilitating a free movement of the regulators and providing for the varying positions thereof and facilitating an unobstructed operation of all the parts.

The stop device S is shown in the nature of a segment-disk fixed to the power-wheel carrier and having a stop-face 32 in concentric relation with the axis of movement of said carrier and in position for coöperating with the stop member 26 to prevent the opening movement of the load-discharger when the parts are in the positions shown in Fig. 2.

As a means for normally holding the stop member 26 against accidental movement and until the load-receiver arrives at a predetermined point in its reciprocatory movement I have provided a counterweighted latch O, having a catch 33 at the inner non-counterweighted end thereof, which is normally held in engagement with the latch-engaging arm 28, and as a means for actuating the latch to release the arm 28 and permit an opening movement of the closers L and L', I have provided a by-pass latch-tripper 35, pivotally supported on the framework of the machine, and which latch-tripper is furnished at the upper end thereof with a hook or projection 36 and at the lower end thereof with a counterweight 37 for normally retaining the latch-tripper in position for engaging the non-counterweighted end of the latch O during the ascending movement of the load-receiver, whereby at a predetermined point in said ascending movement said latch will be tripped to release the closers and permit the discharge of the completed load from the load-receiver.

By comparison of Figs. 4 and 6 of the drawings it will be seen that when the load-receiver has arrived at its truly-poised position and the latch O is tripped to release the closers L and L' the stream-controlling power-transmitter will be in its chute-closing position and the stop member 26 will be shifted on the opening movement of the closers from the position shown in Fig. 4 to that shown in Fig. 6, thus blocking the opening movement of the power-transmitter, and, further, that during the ascending movement of the load-receiver from the position shown in Fig. 4 to that shown in Fig. 6 the non-counterweighted end of the actuator 18, which bears against the under side of the actuator 17, will be held by the locked actuator 17 against upward movement, while its counterweighted end will be elevated to the position shown in Fig. 6, in which position said actuator will remain until the completed load of the load-receiver is fully discharged and the closers L and L' return to their normal closed positions, which throws the stop member 26 from the position shown in Fig. 6 to that shown in Fig. 2, thus releasing the stop device S of the power-transmitter and permitting the counterweighted end of the actuator 18 to descend and thereby lift the actuator 17 and shift said power-transmitter from the position shown in Fig. 6 to that shown in Fig. 2.

For the purpose of preventing a premature closing movement of the power-transmitter the power-transmitter carrier is furnished with a depending by-pass arm 40, which engages a by-pass 41, pivotally supported on the load-receiver, and which by-pass holds said carrier against movement until the load-receiver arrives at a predetermined point in its ascending movement.

The surplus receiving and resupplying apparatus comprises, in the preferred form thereof illustrated in the drawings, an annular conveyer or transferring-receiver (designated by T) having a multiplicity or circuit of circumferentially-disposed compartments, (each designated by 42,) which conveyer is supported at one side of the load-receiver for rotation in a plane paralled to the plane of reciprocation of said receiver.

In the construction and organization shown in the drawings the conveyer or annulus is divided radially by partitions 44 into a circuit of compartments 45, each of which is open at its outer and inner ends, and said conveyer is so disposed with relation to the surplus-discharger 6 and surplus-receiver 7 of the load-receiver that the surplus material will be discharged into the inner ends of the lower compartments of the conveyer successively and will be carried by said compartments to and discharged into the surplus-receiver 7.

For the purpose of closing the filled compartments of the conveyer during the rotation thereof I have provided a curved closer-plate 46, which is fixed below and extends around the lower portion of the conveyer and is furnished at one end thereof with a discharge spout or chute 47, the lower end of which is in vertical alinement with and is adapted to enter the open end of the surplus-receiving conduit 7 of the load-receiver, this construction permitting the surplus material discharged from the load-receiver to be deposited in the lower compartments of the conveyer upon the closer-plate, where it is advanced by the partitions of the compartments during the rotation of the conveyer to a point where it is discharged through the spout 47 into the surplus-receiving conduit of the load-receiver.

By providing an annular conveyer supported for rotation in a vertical plane I am enabled to bring the outer ends of the surplus-discharger and surplus-receiver in comparatively close relation one at the inner and the other at the outer side of the conveyer, thus materially economizing in space and facilitating the discharging from and resupplying of material to the load-receiver at points in very close proximity.

As a means for actuating the conveyer simultaneously with the supply of the overload to the receiver, which in the present case is preferable, I have provided actuating mechanism directly controlled by the power-transmitter. This actuating mechanism, in the preferred form thereof illustrated in the accompanying drawings, comprises a gear 50, fixed to the conveyer in concentric relation therewith and meshing with an intermediate gear 51, pivotally supported in concentric relation with the axis of oscillation of the power-transmitter and meshing with a pinion 52, fixed to the shaft of said power-transmitter, the construction and organization of this actuating mechanism being such that during the rotation of the power-transmitter P the conveyer will have a rotative movement imparted thereto.

From the foregoing description of the several operative parts of the weighing-machine and by reference to the accompanying drawings it will be seen that an overload is first supplied to the load-receiver sufficient to overcome the resistance of the beam mechanism and carry said receiver below its outer poising-line, that during the descent of the load-receiver the power-transmitter is shifted from the position shown in Fig. 11 to that shown in Fig. 13, and after the same has arrived at the position shown in Fig. 13 and the load-receiver is descending below its poising-line the load-reducing valve has an opening movement imparted thereto, thereby discharging the overload into the rotative conveyer. After sufficient surplus is discharged into the rotative conveyer to cause an ascending movement of the load-receiver to bring it to its true poising position, during which ascent the load-reducing valve is gradually closed, the latch O is tripped, causing an opening movement of the closers L and L', thus discharging the completed load, and after the load is discharged and the closers are returned to their normal closed positions the power-transmitter is shifted from the position shown in Fig. 13 to that shown in Fig. 11, thus uncovering the discharge-outlet of the supply-chute and allowing the material to descend into the compartments of said power-transmitter and thence into the load-receiver, the gravitating material rotating said transmitter, which through the intermediate gearing imparts a rotative movement to the conveyer, causing said conveyer to advance the material contained therein to the point where it is discharged into the surplus-receiving conduit of said conveyer as a part of a new load, the rotation of the conveyer taking place simultaneously with the supply of the overload. This constitutes one of the cycle of operations of the coöperative elements of the weighing-machine and which operations are repeated in the order named.

Inasmuch as the rotary device P has two functions, it constituting a power-transmitter or power-wheel for actuating the rotary device or movable conveyer T and also constituting a stream-controller, it will be understood that where this rotary device is termed the "stream-controlling wheel" in certain claims the power-transmitting function of said wheel does not necessarily enter into its operation; but where said rotary device P is referred to as a "power-transmitter" in said claims the stream-controlling function in most cases enters into its operation.

Having described my invention, I claim—

1. The combination, with weighing mechanism including a reciprocatory load-receiver, of supplying means embodying a material-conduit, and a material-actuated stream-controlling wheel in coöperative relation with said conduit and receiver and having a shiftable axis of movement.

2. The combination, with weighing mechanism including a reciprocatory load-receiver, of stream-supplying means including a material-conduit, and a material-driven stream-controlling wheel interposed between said conduit and receiver and having two independent axes of movement.

3. The combination, with weighing mechanism including a reciprocatory load-receiver, of a material-supply chute or hopper disposed above said receiver, and a material-actuated stream-controlling wheel supported between said chute and receiver and shiftable in a plane crosswise of said chute.

4. The combination, with weighing mechanism including a reciprocatory load-receiver, of a supply-chute; a material-driven stream-controlling wheel supported between said supply-chute and receiver and having two independent axes of movement; and means actuated by the weighing mechanism for controlling the movement of said wheel.

5. The combination, with weighing mechanism including a reciprocatory load-receiver, of a stream-controlling wheel supported above said load-receiver for rotation about one axis and for movement in the arc of a circle about an independent axis, and means for supplying material to said wheel at one side of its axis of rotation to thereby impart rotative movement thereto.

6. The combination, with weighing mechanism including a reciprocatory load-receiver, of a material-conduit disposed above said load-receiver; a multicompartment stream-controlling wheel supported for rotative movement between said chute and said receiver, and in position to be actuated by the material as it passes through said chute, and having its axis of rotation shiftable in a plane crosswise of said chute.

7. The combination, with weighing mechanism including a reciprocatory load-receiver, of a material-conduit having a depending cut-off plate; a multicompartment stream-controlling wheel supported for rotation between the load-receiver and discharge end of the conduit, and shiftable bodily toward and away from the cut-off plate.

8. The combination, with weighing mechanism including a reciprocatory load-receiver and with a material-conduit having a depending fixed cut-off plate, of a stream-controlling wheel supported between the receiver-conduit and shiftable toward and away from the cut-off plate; a movable carrier for said wheel; and means for actuating the carrier.

9. The combination, with weighing mechanism including a reciprocatory load-receiver and with a material-conduit having a depending curved cut-off plate or wheel-compartment closer, of a multicompartment material-rotated wheel disposed above the load-receiver; an oscillatory carrier for said wheel;

and means controlled by the weighing mechanism for effecting an oscillatory movement of the carrier whereby said wheel will have movements alternately toward and away from said cut-off plate.

10. The combination, with weighing mechanism including a reciprocatory load-receiver, of stream-supplying means including a material-conduit having a depending cut-off plate; a stream-controlling wheel supported for rotation at one side of said plate and between the conduit and load-receiver; and means in connection with said wheel and effective at a predetermined point in the movement of the load-receiver for shifting said wheel bodily toward the cut-off plate whereby to gradually cut off the supply of material to said load-receiver.

11. The combination, with weighing mechanism including a reciprocatory load-receiver, of an oscillatory carrier; a stream-controlling wheel mounted for rotation on said carrier above the load-receiver; a chute supported above and in position to discharge material upon the wheel; means in connection with said carrier and effective for shifting the same transversely of the path of rotation of the wheel; and a cut-off plate or closer coöperating with the wheel for controlling the volume of the stream supplied to the load-receiver and for also stopping said wheel when in a chute-closing position.

12. The combination, with weighing mechanism including a reciprocatory load-receiver, of a stream-supplying chute having at the discharge end thereof a curved depending closer-plate; a wheel supported for rotation below the discharge end of said chute and above said receiver in position to be rotated by the stream of material, and having a circuit of compartments open at their outer ends; a shiftable wheel-carrier; and means rotated by the weighing mechanism for shifting the carrier to bring the periphery of the wheel in engagement with the inner face of the closer-plate to thereby arrest the rotation of said wheel and simultaneously close the open ends of the filled compartments.

13. The combination, with weighing mechanism including a reciprocatory load-receiver, of a supply-chute disposed above the load-receiver; a power-wheel supported between the load-receiver and chute for rotation in the path of the flowing material; means for shifting the wheel crosswise of the discharge end of the chute and into position to be rotated by the gravitating material; and a rotative device supported at one side the load-receiver and operatively connected with the power-wheel.

14. The combination, with weighing mechanism including a reciprocatory load-receiver, of overload-supplying means including a material-conduit and an overshot power-wheel supported between the load-receiver and conduit; actuating instrumentalities for shifting the power-wheel transversely of its axis of rotation and crosswise of the discharge end of the conduit to a position whereby the same may be rotated by the gravitating material; load-reducing means including a rotative device supported at one side the load-receiver; an actuator between and operatively connecting the wheel and rotative device; and means controlled by the weighing mechanism for shifting said wheel to a conduit-closing position.

15. The combination, with weighing mechanism including a reciprocatory load-receiver and with a supply-hopper disposed above said load-receiver, of a multicompartment rotary stream-controller supported between the load-receiver and hopper for rotation in the line of flow of the material and shiftable crosswise the discharge end of said hopper; a counter-weighted controller-carrier normally holding said controller in position to cut off the supply of material to the load-receiver; and means controlled by the weighing mechanism for shifting the stream-controller into position to be operated by the gravitating material and with its axis to one side the line of flow of said material.

16. The combination, with weighing mechanism including a reciprocatory load-receiver and with a supply apparatus including a hopper, of a material-rotated stream-controlling wheel supported between the hopper and load-receiver and shiftable in a plane crosswise of its path of rotation; and means controlled by the weighing mechanism for causing the power-wheel to move to a hopper-closing and a hopper-opening position alternately.

17. The combination, with weighing mechanism including a load-receiver, of supply apparatus including a hopper having a depending curved wheel-compartment closer; an overshot power-wheel supported between the load-receiver and hopper for movement toward and away from the closer and having a series of circumferential compartments; means in connection with the power-wheel and effective for normally retaining the same in a hopper-closing position with its periphery in tight engagement with the closer; and means controlled by the weighing mechanism for shifting the power-wheel to a hopper-opening position away from said closer and in position to be actuated by the material flowing from the hopper to the load-receiver.

18. The combination, with weighing mechanism including a load-receiver having a closer and with a supply-hopper, of a material-actuated power-transmitter supported between the load-receiver and hopper; means for shifting the power-wheel transversely of its path of rotation to a hopper-closer and to a hopper-opening position alternately; reciprocally-effective stop devices one of which is connected with the power-wheel carrier and is effective for blocking the opening movement of the closer when the power-wheel is in its hopper-opening position, and the other of which is connected with the closer and is effective for blocking the hopper-opening movement of the power-wheel when the closer is in its open position.

19. The combination, with weighing mechanism including a reciprocatory load-receiver having a load-discharger and with a supply-hopper, of a multicompartment power-wheel supported between the hopper and load-receiver; a closer fixed to said hopper at one side the discharge-opening thereof in position for closing the filled compartments of the power-wheel when the power-wheel is in one position; means for shifting the power-wheel normally into engagement with the closer, to thereby prevent rotative movement of said power-wheel and simultaneously close the discharge-opening of the hopper; means for shifting the power-wheel away from said closer into a position whereby the same will be rotated by the gravitating material; and reciprocally-effective stop devices in operative relation with the power-wheel and load-discharger and effective one for blocking the opening movement of the load-discharger when the power-wheel is in its hopper-opening position, and the other of which is effective for blocking the hopper-opening movement of the power-wheel when the load-discharger is in its open position.

20. The combination, with a reciprocatory load-receiver and with a supply-hopper, of a material-actuated rotary power-transmitter in coöperative relation with the receiver and hopper and having a shiftable axis of movement; and a movable conveyer in operative connection with, and actuated by, the power-transmitter.

21. The combination, with a reciprocatory load-receiver, and with a hopper, of a material-actuated power-transmitter in operative relation with said hopper and having a shiftable axis of movement; and a rotary conveyer actuated by the power-transmitter.

22. The combination, with a reciprocatory load-receiver, and with a material-conduit, of a material-actuated rotary power-transmitter located between said receiver and conduit and shiftable in a plane transverse to its path of rotation; and a rotary conveyer supported below and actuated by said transmitter.

23. The combination, with a reciprocatory load-receiver, and with a material-conduit, of a material-actuated rotary power-transmitter located below said conduit and shiftable in a plane transverse to its path of rotation; a conveyer supported for rotation below the power-transmitter; and gearing operatively connecting said conveyer and power-transmitter.

24. The combination, with an overload-supply apparatus, of a load-receiver having a surplus-discharger and a surplus-receiver; a rotary conveyer having a series of circumferentially-disposed compartments open at the periphery of said conveyer; and a fixed closer-plate extending around a portion of the periphery of said conveyer and closing the open ends of certain compartments.

25. The combination, with an overload-supply apparatus, of a load-receiver having a surplus-discharger and a surplus-receiver; a conveyer supported for rotative movement in a vertical plane and having a series of compartments in operative relation successively with a surplus-discharger and a surplus-receiver; and means independent of the weighing mechanism for rotating said conveyer to transfer material from the surplus-discharger to the surplus-receiver.

26. The combination, with weighing mechanism including a reciprocatory load-receiver and with a supply-chute, of a rock-shaft journaled between the load-receiver and supply-chute and having two outwardly-extending arms; a stream-controlling wheel having a shaft journaled in the outer ends of said arms in position to be rotated by the material flowing from the supply-chute; and means for actuating the rock-shaft to shift the stream-controlling wheel into chute closing and opening positions alternately.

27. In a weighing-machine embodying a load-receiver and a superposed supply-chute, the combination of a combined stream-controller and power-transmitter comprising a power-wheel carrier pivotally supported between the load-receiver and supply-chute for oscillatory movement crosswise of the discharge end of the chute; a multichambered power-wheel pivotally supported on the carrier for rotation in a vertical plane and in position to be actuated by the material passing through the supply-chute; and a counterweighted arm for normally retaining the power-wheel in position for cutting off the supply of material from said chute.

28. The combination, with weighing mechanism including a load-receiver and with a supply-chute, of a power-wheel carrier pivotally supported for oscillatory movement between the load-receiver and supply-chute; a multichambered power-wheel journaled on the carrier remote from the axis of oscillation thereof and in position to be rotated by the material discharged from the chute; a compartment-closer fixedly supported in position for closing the filled compartments of the power-wheel when said wheel is in its chute-closing position; a counterweighted arm fixed to the rock-shaft and effective for normally retaining the power-wheel in its chute-closing position; and means controlled by the load-receiver at a predetermined point in the movement thereof for shifting the power-wheel to a chute-opening position.

29. The combination, with weighing mechanism including a load-receiver having a discharger and with a superposed supply-chute having a curved compartment-closer depending from the discharge end thereof, of a power-wheel carrier pivotally supported for oscillatory movement above the load-receiver; a multicompartment power-wheel journaled for rotation upon, and at one side the axis of oscillation of, the carrier; a counterweighted arm in connection with the carrier and effective for normally retaining the power-wheel in position for closing the outlet of the supply-chute and in tight engagement with the compartment-closer; interlocking mechanism in operative relation with, and effective for blocking the movements of, the power-wheel and load-discharger reciprocally; and a counterweighted actuator in operative relation with the power-wheel carrier and effective at a predetermined point in the movement of the load-receiver for shifting the power-wheel away from the compartment-closer and in position to be rotated by the impact of material from the supply-chute.

30. The combination, with a supply-hopper, of a material-actuated overshot wheel supported for rotative and bodily oscillatory movements below said hopper; means for shifting the wheel bodily first in one and then in an opposite direction crosswise of the hopper to open and close alternately the discharge end thereof; and a rotary conveyer in geared connection with, and actuated by, the overshot wheel.

31. The combination, with weighing mechanism including a reciprocatory bucket having a surplus-discharging conduit and a surplus-receiving conduit and with overload-supplying means, of an annular transferring-receiver divided radially in a circuit of compartments open at their inner and outer ends, and which receiver has a fixed horizontal axis of movement; a curved closer-plate circumferentially disposed with respect to the lower portion of the annular receiver and having a conduit whose discharge end is located in vertical alinement with the surplus-receiving conduit of the bucket; and means controlled by a member of the supply apparatus for rotating the receiver.

32. The combination, with weighing mechanism including a reciprocatory bucket having a surplus-discharger and a surplus-receiver and with overload-supplying means including a material-rotated wheel-closer, of an annular conveyer supported for rotation in a vertical plane at one side the bucket and in coöperative relation with the surplus-discharger and surplus-receiver thereof and having a multiplicity of circumferentially-disposed compartments open at their inner and outer ends; means in connection with, and effective on a rotative movement of the wheel-closer for rotating, the conveyer; and a fixed closer extending partially around the periphery of the conveyer and in position to close the filled compartments of said conveyer throughout a portion of their advancing movements.

33. The combination, with weighing mechanism including a bucket, of a multicompartment annulus having a fixed horizontal axis of rotation, and which compartments are open at the periphery and the inner side of the annulus; a valve-regulated surplus-discharge conduit having its inner end in communication with the interior of the bucket and having its outer end disposed between the axis and the compartments of the annulus in position for supplying material to said compartments; a fixed closer surrounding a lower portion of the periphery of the annulus and having an outlet or discharge conduit at one end thereof; a surplus-receiving conduit having its outer end in vertical alinement with the fixed closer-outlet and having its inner end in communication with the interior of the bucket; means controlled by the weighing mechanism on the descent of the bucket for governing the surplus discharged from said bucket to the compartments of the annulus; and means operative on the ascent of the bucket above the poising-line for rotating said annulus to transfer the material to the receiving-conduit of said bucket.

34. In a weighing-machine, the combination, with overload-supplying means including a material-driven rotary member, of a rotary conveyer and a reciprocatory load-receiver set side by side and having their respective movements in parallel planes and each of which includes means for transferring material to the other; means operative on the descent of the load-receiver for effecting a transfer of material from said load-receiver to the conveyer; and means operated by the rotary member of the overload-supplying means for imparting a rotative movement to the conveyer and thereby effect a transfer of material therefrom directly to the load-receiver.

35. A weighing-machine comprehending a rotary multicompartment conveyer; a bucket supported for reciprocatory movements in a plane parallel to the plane of rotation of the conveyer and having a surplus-discharger and a surplus-receiver in coöperative relation with the compartments of said conveyer; means for supplying an overload to the receiver and including a material-rotated member; means controlled by the weighing mechanism, on the descent of the bucket, for actuating the surplus-discharger of the receiver; and means operated by the material-rotated member, on the ascent of the bucket, for imparting a rotative movement to the conveyer.

36. The combination, with a reciprocatory load-receiver having a discharger and with means for actuating said discharger, of a vertically-disposed rotary conveyer; and means including a material-operated conveyer-actuator effective on the closing movement of the load-discharger for rotating said conveyer.

37. The combination, with weighing mechanism including a reciprocatory load-receiver having a load-discharger and with means for actuating said discharger, of a rotary multicompartment conveyer supported at one side of the load-receiver and having a fixed horizontal axis of movement; overload-supplying means including a material-rotated power-transmitting stream-controller; means in connection with, and effective for holding, the power-transmitter normally against rotation; means operative with the load-discharger, on the closing movement thereof, for shifting the power-transmitter to a position to be rotated by the material supplied to the load-receiver; actuating means connecting the power-transmitter and rotary conveyer; and means in connection with the load-receiver and operative on the descending movement thereof below its poising-line for discharging a portion of the load of said receiver to the conveyer.

38. The combination, in a weighing-machine, of a reciprocatory load-receiver or bucket having a completed load-discharger; means for holding the load-discharger normally in its closed position; a discharger-closing actuator; overload-supplying means in operative relation with the load-receiver; a valve-controlled surplus-discharge conduit and a surplus-receiving conduit communicating with the interior of the load-receiver; a rotary surplus-receiving conveyer having a fixed horizontal axis of movement and supported at one side of the load-receiver and in coöperative relation with the surplus-discharge conduit and surplus-receiving conduit thereof; means for imparting an opening movement to the valve of the surplus-discharge conduit during the descending movement of the load-receiver below its poising-line; and means operative subsequently to the closing movement of the load-discharger for effecting a surplus-transferring movement of the conveyer.

39. The combination, in a weighing-machine, of a reciprocatory load-receiver having a load-discharger; a load-discharger actuator; a superposed material-supply apparatus; a surplus-discharge conduit and a surplus-receiving conduit communicating with the interior of the load-receiver and the former having a self-closing valve; a rotary surplus-receiving conveyer supported at one side the load-receiver with the plane of its axis intersecting the path of movement of said receiver and having a series of compartments movable successively into coöperative relation with the surplus discharging and receiving conduits of the load-receiver; means operative on the descending movement of the load-receiver for imparting an opening movement to the valve of the surplus-discharge conduit; and means operative subsequently to the complete closing of the load-discharger for permitting a rotative movement of the conveyer.

40. The combination, in an automatic weighing-machine, of a reciprocatory load-receiver having a counterweighted self-shutting closer and also having a valve-controlled surplus-discharger and surplus-receiver; means for normally locking the closer in its closed position; a vertically-disposed rotary conveyer supported in operative relation with the surplus-discharger and surplus-receiver; means operative on the descending movement of the load-receiver below its poising-line for imparting an opening movement to the valve of the surplus-discharger; means operative on the ascending movement of the load-receiver for releasing the closer-locking means; and means operative subsequently to the closing movement of the closer for permitting a rotary movement of the conveyer.

41. The combination, with weighing mechanism including a reciprocatory bucket having a surplus-discharger and a surplus-receiver and with a supply-chute having a depending curved plate, of an annular conveyer supported for rotation in a vertical plane at one side of the bucket and in coöperative relation with the surplus-discharger and surplus-receiver thereof; a gear fixed to the annular conveyer; an intermediate gear supported above and meshing with the conveyer-gear; a power-wheel carrier mounted for oscillatory movement on the shaft of the intermediate gear and having radial arms extending beyond the periphery of said intermediate gear; a material-driven power-wheel having a shaft journaled in the outer ends of the arms of the power-wheel carrier; a pinion fixed to the power-wheel shaft and meshing with the teeth of the intermediate gear; means carried by the power-wheel carrier for normally retaining the power-wheel in position for closing the outlet of the supply-chute and with its periphery in engagement with the depending curved plate thereof; and means controlled by the weighing mechanism for shifting the power-wheel away from the depending plate in a plane concentric to the axis of the intermediate gear, and in position to be rotated by the material from the supply-chute.

42. The combination, with weighing mechanism including a load-receiver having a surplus-discharger and a surplus-receiver and with a supply-chute, of a vertically-disposed gear-wheel having a multicompartment annular conveyer fixed thereto; an intermediate gear meshing with the conveyer-gear; a multicompartment material-driven power-wheel having a pinion meshing with the intermediate gear and supported for movement transversely of the outlet of the supply-chute in a plane concentric to the axis of the intermediate gear; and means controlled by the weighing mechanism for effecting a transverse movement of said power-wheel in opposite directions alternately, to thereby control the supply of material to the load-receiver and also govern the operation of the conveyer.

43. The combination, with a reciprocatory load-receiver, of a pivotally-supported closer, and a regulator pivoted to the load-receiver and to said closer and embodying means for shutting said closer.

44. The combination, with a reciprocatory load-receiver, of a closer pivotally supported at its outer end on said load-receiver, and a regulator pivotally mounted on the load-receiver and pivoted to the inner end of said closer and having a counterweighted arm for actuating the regulator and closer simultaneously.

45. The combination, with a reciprocatory load-receiver, of two oppositely-disposed closers pivotally supported at their outer ends on the load-receiver; two operatively-connected, oppositely-disposed regulators pivotally supported on the load-receiver and pivotally connected to the closers at the inner ends thereof; and two counterweighted arms, one on each regulator, for normally retaining the closers in their shut positions.

46. The combination, with a load-receiver, of a load-discharger comprising two oppositely-disposed closer-plates pivotally connected by links at their outer ends to opposite sides of the load-receiver; two vertically-disposed regulator-blades pivotally supported on the load-receiver above the inner ends of the closer-plates and pivotally connected to the inner ends of said closer-plates; means carried by the regulator-blades for normally imparting a closing movement to the closer-plates; and means in connection with the regulator-blades and load-receiver for normally holding said blades in their closer-shutting positions.

47. The combination, with weighing mechanism including a reciprocatory load-receiver, of a closer suspended at its outer end by links from one side of the load-receiver; a vertically-disposed regulator pivotally carried on the load-receiver and pivotally connected to the inner end of the closer; a counterweighted arm on the regulator, so disposed as to impart a closing movement to the closer; means in connection with the load-receiver and regulator for normally locking the regulator in its closer-shutting position; and means operative at a predetermined point in the movement of the load-receiver for releasing the closer-locking means.

48. The combination, with a reciprocatory load-receiver, of a closer pivotally supported at its outer end on the load-receiver; a regulator-blade disposed at an angle to the plane, and depending below the inner end, of the closer and pivotally connected to said closer; a counterweighted regulator-blade actuator pivotally carried on the load-receiver, and constructed and organized to effect a closing movement of the closer; means in connection with, and effective for normally locking, the regulator-blade actuator in its closer-shutting position; and means effective at a predetermined point in the movement of the load-receiver for releasing said actuator to facilitate an opening movement of the closer.

FRANCIS H. RICHARDS.

Witnesses:
F. N. CHASE,
ANDREW FERGUSON.